United States Patent
Kawakita et al.

(10) Patent No.: US 11,689,311 B2
(45) Date of Patent: Jun. 27, 2023

(54) OPTICAL COMMUNICATIONS SYSTEM, BRANCHING RATIO DETERMINATION METHOD, AND TRANSMISSION DISTANCE DETERMINATION METHOD

(71) Applicant: NIPPON TELEGRAPH AND TELEPHONE CORPORATION, Tokyo (JP)

(72) Inventors: Atsuko Kawakita, Musashino (JP); Kazutaka Hara, Musashino (JP); Yasutaka Kimura, Musashino (JP); Kenji Horikawa, Musashino (JP); Hiroyuki Furukawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 101 days.

(21) Appl. No.: 17/440,410

(22) PCT Filed: Mar. 6, 2020

(86) PCT No.: PCT/JP2020/009559
§ 371 (c)(1),
(2) Date: Sep. 17, 2021

(87) PCT Pub. No.: WO2020/189321
PCT Pub. Date: Sep. 24, 2020

(65) Prior Publication Data
US 2022/0166532 A1    May 26, 2022

(30) Foreign Application Priority Data
Mar. 20, 2019 (JP) .............................. JP2019-052095

(51) Int. Cl.
 *H04J 14/02* (2006.01)
 *G02B 6/287* (2006.01)
 *H04B 10/272* (2013.01)
(52) U.S. Cl.
 CPC ............ *H04J 14/025* (2013.01); *G02B 6/287* (2013.01); *H04B 10/272* (2013.01)
(58) Field of Classification Search
 CPC ...... H04J 14/025; H04B 10/272; G02B 6/287
 See application file for complete search history.

(56) References Cited

U.S. PATENT DOCUMENTS

| 2002/0110315 A1* | 8/2002 | Redmond ............ H04B 10/272 385/24 |
| 2002/0122244 A1* | 9/2002 | Sotgiu ................. H01S 3/06754 359/341.3 |

(Continued)

OTHER PUBLICATIONS

Atsuko Kawakita et al., Long-Reach Optical Access Networks by Splitting Ratio Determination Process with Unsymmetrical Optical Splitter, 2018 IEICE Society Conference, Sep. 11, 2018.

(Continued)

*Primary Examiner* — Dzung D Tran
(74) *Attorney, Agent, or Firm* — Harness, Dickey & Pierce, P.L.C.

(57) ABSTRACT

An object is to provide an optical communication system capable of controlling the output ratio by port and by wavelength for incident light of different wavelengths, a method of determining the split ratio of an uneven-split optical splitter for controlling the output ratio by port and by wavelength, and a transmission range determination method for the optical communication system. The split ratio determination method for an uneven-split optical splitter according to the present invention uses the melt-draw distance to adjust the split ratio of each fiber-optic splitter included in the uneven-split optical splitter such that the light output (Continued)

from the farthest ONUs among each of the ports connected under the ports B to M of the uneven-split optical splitter arrives with the minimum reception sensitivity at OLT receivers in a PON system.

5 Claims, 7 Drawing Sheets

(56) References Cited

U.S. PATENT DOCUMENTS

| | | | |
|---|---|---|---|
| 2005/0019031 A1* | 1/2005 | Ye | H04B 10/07955 398/19 |
| 2018/0045893 A1* | 2/2018 | Huybrechts | G02B 6/3562 |

OTHER PUBLICATIONS

Katsumi Morishita and Nobuyuki Ohta, Fused Fiber Couplers Made Wavelength Insensitive by the Glass Structure Change, Journal of Lightwave Technology, vol. 26, No. 13, 2008, pp. 1915-1920.

Atsuko Kawakita et al., Design for Long-Reach Coexisting PON in Consideration of Area Characteristics with Wavelength Selective Asymmetrical Splitters, OECC/PSC 2019, Jul. 7, 2019.

* cited by examiner

OPTICAL COMMUNICATIONS SYSTEM, BRANCHING RATIO DETERMINATION METHOD, AND TRANSMISSION DISTANCE DETERMINATION METHOD

CROSS-REFERENCE TO RELATED APPLICATIONS

This application is a 371 U.S. National Phase of International Application No. PCT/JP2020/009559 filed on Mar. 6, 2020, which claims priority to Japanese Application No. 2019-052095 filed on Mar. 20, 2019. The entire disclosures of the above applications are incorporated herein by reference.

TECHNICAL FIELD

The present disclosure relates to an optical signal transmission system that multiplexes services by wavelength-division multiplexing (WDM), a split ratio determination method for an uneven-split optical splitter provided in the system, and a transmission range determination method.

BACKGROUND ART

Along with the explosive spread of the Internet, the number of subscribers to fiber to the home (FTTH), which provides high-speed communication services, is increasing. In current FTTH services, a gigabit-ethernet passive optical network (1G-EPON) having a communication speed of 1 Gbit/s is used, but in the future, further increases in bandwidth are demanded in anticipation of factors such as an increase in the number of subscribers associated with further spread of the Internet, backhaul connections for 5G mobile communication systems, Internet of Things (IoT) applications, and 4K/8K high definition video streaming services. To meet these demands, standards organizations such as the IEEE and the ITU are actively discussing already-standardized technologies such as 10G-EPON and 40-gigabit-capable PONs (ITU-T Rec G.989 Series), while also investigating next-generation PON systems at the 100 Gbit/s level (IEEE 802.3 ca).

Generally, in FTTH services, a TDM-PON system based on time-division multiplexing (TDM) as the multiplexing technology and a double star configuration as the network topology has been introduced to accommodate massively deployed subscribers efficiently and economically. Also, to allow users to enjoy multiple services simultaneously, wavelength-division multiplexing (WDM) is being utilized to multiplex services by providing data communication and other services in different optical wavelength bands.

In a PON system, it is desirable to expand area coverage by extending the transmission range, reduce the device cost per user by decreasing the number of devices, and reduce power through station integration. As a technique for extending range to areas having an unbalanced distribution of users, a new method for a PON system utilizing an uneven-split/distribution optical splitter as indicated in Non-Patent Literature 1 has been proposed.

CITATION LIST

Non-Patent Literature

Non-Patent Literature 1: Kawakita et al., "Extension of optical access network through split ratio determination method applying uneven-split/distribution optical splitter," Proceedings of the 2018 IEICE Society Conference, Lecture No. B-8-23, 2018.9

Non-Patent Literature 2: Katsumi Morishita and Nobuyuki Ohta, "Fused Fiber Couplers Made Wavelength Insensitive by the Glass Structure Change," Journal of Lightwave Technology, 2008, Vol. 26, No. 13, Page(s): 1915-1920

SUMMARY OF THE INVENTION

Technical Problem

Non-Patent Literature 1 discloses an optical communication system that provides a data communication service only (one wavelength only) and is provided with an uneven-split/distribution optical splitter capable of extending the transmission range and expanding the number of accommodated users (hereinafter, the "uneven-split/distribution optical splitter" will be referred to as an "uneven-split optical splitter"), but transmission range extension and accommodated user expansion are also demanded for the case of multiplexing services through WDM.

One example of achieving service multiplexing through WDM is a method of inputting/combining signals of different wavelengths from a different port than the input port of the data communication service in an optical splitter. The split ratio of an optical splitter is known to change generally depending on the wavelength as indicated in Expressions (1) and (2). The wavelength dependency of the split ratio of an optical splitter will be described below.

Figure 1:
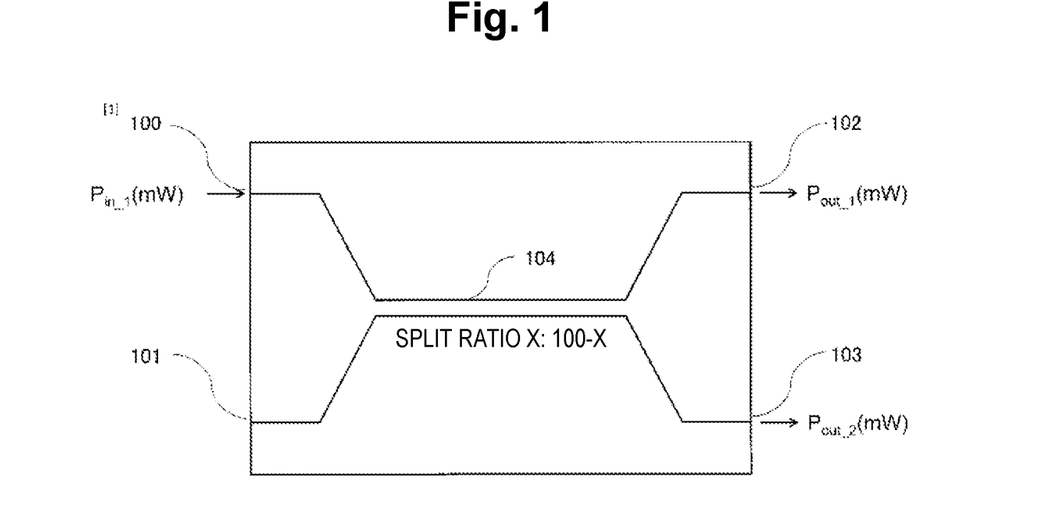
FIG. 1 is a diagram for explaining a fiber-optic splitter.

FIG. 1 is a diagram for explaining a melt-drawn 2-way optical splitter (fiber-optic splitter) among optical splitters. The signs 100 and 101 in the diagram are signal input ports, while the signs 102 and 103 are signal output ports. In the case where light at $P_{in\_1}$ (mW) is input from the port 100, the output powers $P_{out\_1}$ (mW) and $P_{out\_2}$ (mW) of the ports 102 and 103 are expressed by the following expression.

[Math. 1]
$$P_{out_1} = P_{in_1} \cos^2(CL_m) \quad (1)$$

[Math. 2]
$$P_{out\_2} = P_{in\_1} \sin^2(CL_m) \quad (2)$$

Where,
$$C = \frac{3\pi\lambda}{32 n_0 d^2} \frac{1}{1+(1/v)^2},$$
$$v = d\frac{2\pi}{\lambda}(n_0^2 - n_s^2),$$

Lz is the melt-draw distance (μm), λ is the splitter input wavelength, d is the core diameter when drawing for fusion splicing, no is the fiber core refractive index, and $n_s$ is the cladding refractive index.

As indicated by the above expressions, the output properties of a fiber-optic splitter depend on the wavelength (λ). Consequently, to provide universal service to uniformly distributed users, it is conceivable to provide an optical splitter having a fixed split ratio that is not dependent on the input wavelength, like the optical splitter described in Non-Patent Literature 2 for example.

However, in the case of applying the wavelength-insensitive optical splitter of Non-Patent Literature 2 to an access network having an unbalanced user accommodation distribution as illustrated in Non-Patent Literature 1, providing services multiplexed through WDM may be difficult in some cases.

Two factors that make it difficult to provide multiplexed services are:
(i) differences in the optical budget for each service, and
(ii) the optical properties of the optical splitter.

With factor (i), the data communication service and another service have different optical budgets, and therefore when a certain user wants to receive two services, one service may be receivable while the other service is unreceivable in some cases. This factor is resolvable by mapping users in accordance with the transmission range of services having small optical budgets.

Factor (ii) will be described using FIG. 1. In the case where the split ratio of the fiber-optic splitter is set such that at a split location 104, X % of the light incident from the port 100 is output to the port 102 and 100−X % of the light is output to the port 103 (in such a case, the split ratio is defined as X:100−X), the output ratio for the light incident from the port 101 is the inverse of the above, with 100−X % output to the port 102 and X % output to the port 103. Given these optical splitter properties, in the case where light of the same intensity but different wavelengths is incident from each of the ports 100 and 101, outputs from the port 102 have respectively different optical powers. That is, when light of $\lambda 1$ is input into the port 100 and light of $\lambda 2$ is input into the port 101, because the optical splitter is wavelength-insensitive, wavelength-multiplexed light containing X % $\lambda 1$ and 100−X % $\lambda 2$ is output to the port 102, while wavelength-multiplexed light containing 100−X % $\lambda 1$ and X % $\lambda 2$ is output to the port 103. A similar phenomenon also occurs for the port 103. Consequently, the split ratio cannot be differentiated by wavelength, which makes it difficult to provide multiplexed services. The same also applies when light of different wavelengths is incident from the same port.

The case of configuring the uneven-split optical splitter according to Non-Patent Literature 1 using the optical splitter according to Non-Patent Literature 2 is a combination of wavelength-insensitive optical splitters, and therefore the above phenomenon also occurs. Consequently, there is a problem in that an optical communication system in which the uneven-split optical splitter according to Non-Patent Literature 1 is configured using a wavelength-insensitive optical splitter is incapable of controlling the output ratio by port and by wavelength for wavelength-multiplexed light, and providing services multiplexed through WDM is difficult.

Accordingly, to address the above problem, an object of the present invention is to provide an optical communication system capable of controlling the output ratio by port and by wavelength for incident light of different wavelengths, a method of determining the split ratio of an uneven-split optical splitter for controlling the output ratio by port and by wavelength, and a transmission range determination method for the optical communication system.

Means for Solving the Problem

To achieve the above object, the optical communication system according to the present invention takes advantage of the ability to set the split ratio independently for each wavelength by controlling the melt-drawing distance of a fiber-optic splitter, and controls the output ratio by port and by wavelength for incident light of different wavelengths.

Specifically, the optical communication system according to the present invention is provided with:

an uneven-split optical splitter in which m−1 2×2 fiber-optic splitters are combined and connected between m primary ports and m secondary ports (where m is an integer equal to or greater than 2);

an optical line terminal that inputs and outputs optical signals of different wavelengths with respect to the 1st and 2nd primary ports of the uneven-split optical splitter, or inputs and outputs a wavelength-multiplexed optical signal with respect to one of the 1st and 2nd primary ports; and an optical network unit that inputs and outputs optical signals of a single wavelength or wavelength-multiplexed optical signals with respect to each of the secondary ports of the uneven-split optical splitter, wherein in the uneven-split optical splitter, the two inputs of the fiber-optic splitter in a 1st stage are connected to the 1st and 2nd primary ports, and one of the two outputs is connected to the 1st secondary port, one of the two inputs of the fiber-optic splitter in a kth stage (where k is an integer equal to or greater than 2 and equal to or less than m−2) is connected to the (k+1)th primary port while the other of the two inputs is connected to one of the two outputs of the fiber-optic splitter in a (k−1)th stage, and one of the two outputs is connected to the kth secondary port, one of the two inputs of the fiber-optic splitter in a (m−1)th stage is connected to the mth primary port while the other of the two inputs is connected to one of the two outputs of the fiber-optic splitter in a (m−2)th stage, and the two outputs are connected to the (m−1)th and mth secondary ports, and each of the fiber-optic splitters has a melt-draw distance that achieves a split ratio determined by a maximum distance and a wavelength, such that an optical signal from the optical network unit at the maximum distance from the optical line terminal existing at each secondary port other than the 1st secondary port arrives at the optical line terminal with a minimum reception sensitivity or higher for all wavelengths, where the fiber-optic splitter in the (m−1)th stage exists in a case where m is 3 or greater, and the fiber-optic splitter in the kth stage exists in a case where m is 4 or greater.

Also, in the optical communication system according to the present invention, at least one or more even-split optical splitters are disposed between the secondary ports of the uneven-split optical splitter and the optical network unit.

Furthermore, in the optical communication system according to the present invention, at least one or more even-split optical splitters are disposed between the primary ports of the uneven-split optical splitter and the optical line terminal.

Here, a split ratio determination method for an uneven-split optical splitter according to the present invention includes:

detecting, for each secondary port other than the 1st secondary port, a maximum distance between the optical network unit farthest from the optical line terminal and the optical line terminal;

computing a split ratio by wavelength for each fiber-optic splitter by substituting the maximum distance into a function of the split ratio of the fiber-optic splitter, the maximum distance, and the wavelength; and finding a melt-draw distance for each fiber-optic splitter by which the computed split ratios for each wavelength are achieved at the same time.

Also, a transmission range determination method for an optical communication system according to the present invention includes using the split ratio of the fiber-optic splitter in the 1st stage computed by the split ratio determination method to compute, for each wavelength, a maximum distance between the optical line terminal and the optical network unit farthest from the optical line terminal and connected to the 1st secondary port, and treating the shortest maximum distance as the transmission range of the 1st secondary port.

Note that the above inventions can be combined where possible.

Effects of the Invention

According to the present invention, it is possible to provide an optical communication system capable of controlling the output ratio by port and by wavelength for incident light of different wavelengths, a method of determining the split ratio of an uneven-split optical splitter for controlling the output ratio by port and by wavelength, and a transmission range determination method for the optical communication system.

DESCRIPTION OF EMBODIMENTS

Embodiments of the present invention will be described with reference to the attached drawings. The embodiments described hereinafter are an example of the present invention, but the present invention is not limited to the following embodiments. Note that in the specification and the drawings, components denoted by the same signs are assumed to be identical to each other.

(Features of Invention)

Figure 2:
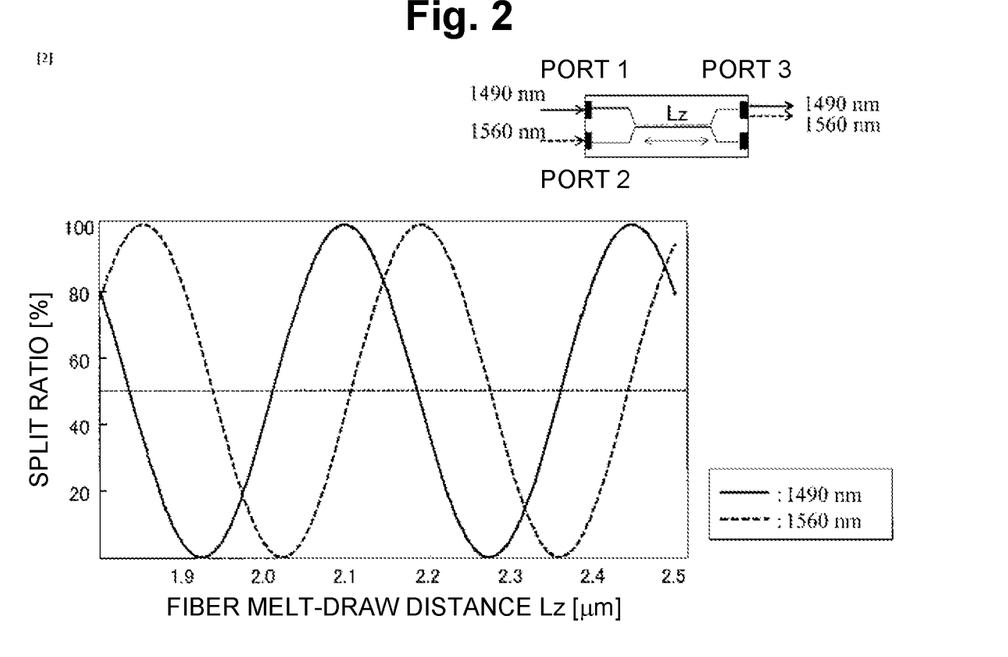
FIG. 2 is a diagram for explaining output variations with respect to the melt-draw distance of a fiber-optic splitter.

FIG. 2 is a graph illustrating output variations with respect to the melt-draw distance Lz on the basis of Expressions (1) and (2) described above for the case where the wavelengths of the light input into the ports of the fiber-optic splitter in FIG. 1 are $\lambda_1 = 1490$ nm and $\lambda_2 = 1560$ nm. In the case of inputting different wavelengths from different ports as in FIG. 2, the waveform of the split ratio with respect to the melt-draw distance Lz has a different period for each wavelength. In other words, by controlling the melt-draw distance Lz, a desired split ratio can be set for each wavelength. The present invention utilizes this property of a fiber-optic splitter. Note that in FIG. 2, light of different wavelengths is input into each of the input ports of the fiber-optic splitter, but the case where wavelength-multiplexed light is input into a single input port is also similar.

Embodiment 1

Figure 3:
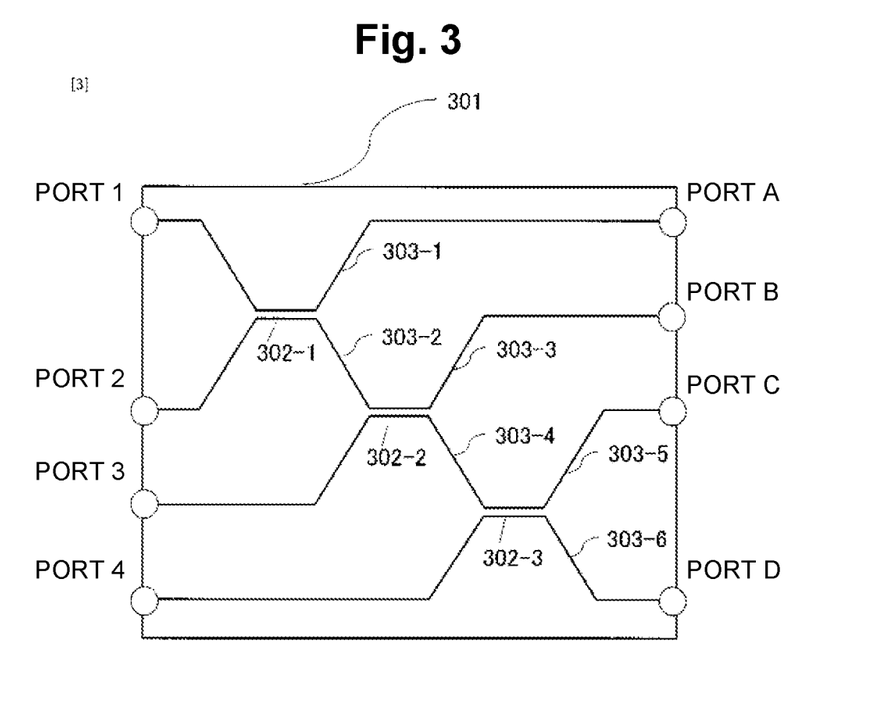
FIG. 3 is a diagram for explaining an uneven-split optical splitter provided in an optical communication system according to the present invention.

Embodiment 1 will be described using FIGS. 3 and 4. The uneven-split optical splitter according to Non-Patent Literature 1 is configured to have one input port and four output ports, but to combine multiple services using an uneven-split optical splitter, assume that an uneven-split optical splitter is provided with four input ports and four output ports like the sign 301 in FIG. 3. In the diagram, the signs 302-1 to 302-3 indicate split points (melt-draw locations), and the signs 303-1 to 303-6 indicate the output fibers from each of the split points. Note that ports 3 and 4 may also be closed.

The split ratios with respect to the light of wavelength $\lambda_1$ input from the port 1 at the three split points denoted by the signs 302-1 to 302-3 are taken to be (302-1) X: 100–X,
(302-2) Y: 100–Y, and
(302-3) Z: 100–Z.

In other words, the above indicates that the input optical power is split according to the following ratios:

at the split point 302-1, X % to 303-1, and 100–X % to 303-2,
at the split point 302-2, Y % to 303-3, and 100–Y % to 303-4, and
at the split point 302-3, Z % to 303-5, and 100–Z % to 303-6.

Meanwhile, the split ratios with respect to the light of wavelength $\lambda_2$ input from the port 2 at the three split points are taken to be (302-1) X': 100–X',
(302-2) Y': 100–Y', and
(302-3) Z': 100–Z'.

In other words, the above indicates that the input optical power is split according to the following ratios:

at the split point 302-1, 100–X'% to 303-1, and X'% to 303-2,
at the split point 302-2, Y'% to 303-3, and 100–Y'% to 303-4, and
at the split point 302-3, Z'% to 303-5, and 100–Z'% to 303-6.

The split ratios X', Y', and Z' for the light of wavelength $\lambda 2$ can be set to different values than the split ratios X, Y, and Z for the light of wavelength $\lambda 1$ by adjusting the melt-draw distance Lz as described above.

In an optical communication system, for a service 1 provided at the wavelength $\lambda_1$ and a service 2 provided at the wavelength $\lambda_2$, there is a demand for the light output from each of the farthest optical network unit (ONU) connected under the port B, the farthest ONU connected under the port C, and the farthest ONU connected under the port D to arrive at the receiver on the optical line terminal (OLT) side with a minimum reception sensitivity. Accordingly, by setting each melt-draw distance Lz such that the split ratios X, Y, Z and X', Y', Z' of the fiber-optic splitters (302-1 to 302-3) are the desired values, communication with all ONUs under the OLT is established, and an extension of the range of the port A is also achieved.

Here, to achieve service multiplexing through WDM and extend the range of the port A in an optical communication system, a method of determining the split ratio and the melt-draw distance of a fiber-optic splitter included in an uneven-split optical splitter will be described.

The split ratio determination method is performed under a predetermined condition described later in an optical communication system provided with an uneven-split optical splitter described below, an optical line terminal, and an optical network unit. Here, the uneven-split optical splitter is an optical splitter in which m−1 2×2 fiber-optic splitters are combined and connected between m primary ports and m secondary ports (where m is an integer equal to or greater than 2). The optical line terminal inputs and outputs optical signals of different wavelengths with respect to the 1st and 2nd primary ports of the uneven-split optical splitter. Alternatively, a wavelength-multiplexed optical signal is input and output with respect to one of the 1st and 2nd primary ports. The optical network unit inputs and outputs optical signals of a single wavelength with respect to each of the secondary ports of the uneven-split optical splitter. Alternatively, a wavelength-multiplexed optical signal is input and output.

The predetermined condition refers to the case where the connection relationships described next are satisfied in the uneven-split optical splitter. Here, in the 1st-stage fiber-optic splitter, the 1st input and the 2nd input of the primary ports are connected, and one of the two outputs obtained is connected to the 1st output port of the secondary ports. Next, in the kth-stage fiber-optic splitter, the (k+1)th input of the primary ports and the output from one of the two outputs of the (k−1)th-stage fiber-optic splitter are connected as two inputs, and one of the two outputs obtained is connected to the kth output port of the secondary ports. Here, k is an integer equal to or greater than 2 and equal to or less than m−2. Furthermore, the mth input of the primary ports is connected to one of the two inputs in the (m−1)th-stage fiber-optic splitter. The two outputs of the (m−1)th-stage fiber-optic splitter are connected to the (m−1)th and mth output ports of the secondary ports, respectively.

The split ratio determination method determines the split ratio as described below in the case where the above connection relationships are satisfied.

Here, first, the practitioner detects the maximum distance between the optical network unit farthest from the optical line terminal and the optical line terminal for each of the 2nd and subsequent output ends of the secondary ports. Next, the maximum distance is substituted into a function of the split ratio of the fiber-optic splitter, the maximum distance, and the wavelength to compute the split ratio by wavelength for each fiber-optic splitter. Thereafter, the practitioner finds the melt-draw distance for each fiber-optic splitter by which the computed split ratios for each wavelength can be achieved at the same time. Where the fiber-optic splitter in the (m−1)th stage exists in a case where m is 3 or greater, and the fiber-optic splitter in the kth stage exists in a case where m is 4 or greater.

In the present embodiment, the case where m=4 will be described.

Figure 4:
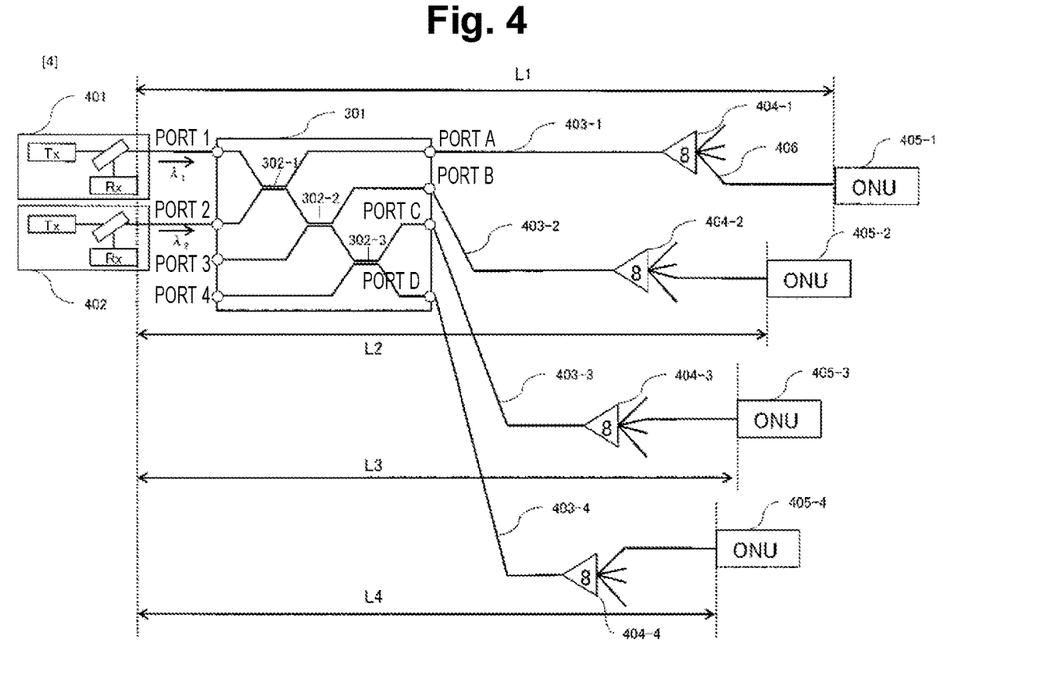
FIG. 4 is a diagram for explaining the optical communication system according to the present invention.

FIG. 4 is a diagram for explaining a passive double star network model applying an uneven-split optical splitter with a 4-way split in the initial stage. In the diagram, the sign 401 indicates an OLT that provides a service 1 (wavelength λ1), the sign 402 indicates an OLT that provides a service 2 (wavelength λ2), the sign 301 indicates the uneven-split optical splitter of FIG. 3, the signs 403-1 to 403-4 indicate main subscriber fiber-optic lines, the signs 404-1 to 404-4 indicate second-stage optical splitters each having an 8-way split, the sign 406 indicates eight branch subscriber fiber-optic lines, and the signs 405-1 to 405-4 respectively indicate ONUs installed the farthest away from the exchanges of a telecommunications carrier (the OLTs 401 and 402) under the ports A to D, respectively.

Also, the distance from the receivers (Rx) of the OLTs 401 and 402 to the farthest ONUs (signs 405-1 to 405-4) connected to each port is designated L1, L2, L3, and L4 (km). The minimum reception sensitivity of the OLT that provides the service 1 and the OLT that provides the service 2 (signs 401 and 402) is designated $P_{rec}$ [dBm] and $P'_{rec}$ [dBm], respectively. The output power from the ONU of the service 1 and the ONU of the service 2 are designated $P_{onu}$ [dBm] and $P'_{onu}$ [dBm], respectively. The transmission loss of the fiber for the wavelength λ1 and the wavelength λ2 is designated α [dBm/km] and β [dBm/km], respectively. The splitter loss for the service 1 ($λ_1$) and the service 2 ($λ_2$) of the 8-way optical splitters (signs 404-1 to 404-4) is designated A [dB] and A' [dB], respectively. Other loss, including fiber connection loss and the like, is designated B [dB].

The distance to the farthest ONU under the port B is designated L2 [km], the distance to the farthest ONU under the port C is designated L3 [km], and the distance to the farthest ONU under the port D is designated L4 [km]. Additionally, the split ratios X, Y, Z, and X', Y', Z' are set such that the light output from the farthest ONU under the port B, the farthest ONU under the port C, and the farthest ONU under the port D is $P_{rec}+\Delta P$ [dBm] and $P'_{rec}+\Delta P$ [dBm] at the receivers of the OLTs 401 and 402, respectively. With this configuration, an extension of the transmission range of the port A is attained.

Here, ΔP is a margin. Specifically, the margin of the minimum reception sensitivity ($P_{rec}$ or $P'_{rec}$)+ΔP is set in consideration of lowered optical output due to long-term deterioration of the LD installed in the ONU, optical output variations due to current instability in the LD driver, and optical output variation in the LD due to optical feedback (Fresnel reflections associated with changes in the refractive index) at the optical splitter or a fiber connection point. For example, ΔP is a value from 5% to 10% of the minimum reception sensitivity.

Under the condition described above, for the service 2, the following expressions hold for the optical power when the light output from the farthest ONU under the port B, the light output from the farthest ONU under the port C and the light output from the farthest ONU under the port D arrive at the OLT. The right sides of Expressions (3) to (5) are all the minimum reception sensitivity ($P'_{rec}+\Delta P$) of the OLT (sign 402) that provides the service 2.

[Math. 3]

$$P'_{onu}-A'+10\{\log_{10}[X'Y']-4\}-\beta L_2-B=P'_{rec}+\Delta P \qquad (3)$$

[Math. 4]

$$P'_{onu}-A'+10\{\log_{10}[X'(100-Y')Z']-6\}-\beta L_3-B=P'_{rec}+\Delta P \qquad (4)$$

[Math. 5]

$$P'_{onu}-A'+10\{\log_{10}[X'(100-Y')(100-Z')]-6\}-\beta L_4-B=P'_{rec}+\Delta P \qquad (5)$$

Solving Expressions (3), (4), and (5) for X', Y', and Z' gives

[Math. 6]

-continued $$X' = 10^2 \times 10^{-\frac{C}{10}} \left( 10^{\frac{\beta L_2}{10}} + 10^{\frac{\beta L_3}{10}} + 10^{\frac{\beta L_4}{10}} \right) \quad (6)$$

[Math. 7]

$$Y' = 10^2 \times \left( \frac{10^{\frac{\beta L_2}{10}}}{10^{\frac{\beta L_2}{10}} + 10^{\frac{\beta L_3}{10}} + 10^{\frac{\beta L_4}{10}}} \right) \quad (7)$$

[Math. 8]

$$Z' = 10^2 \times \left( \frac{10^{\frac{\beta L_3}{10}}}{10^{\frac{\beta L_3}{10}} + 10^{\frac{\beta L_4}{10}}} \right) \quad (8)$$

[Math. 9]

where, $$C = P'_{onu} - (P'_{rec} + \Delta P) - A' - B \quad (9)$$

In the above, $P'_{onu}$ and $P'_{rec}$ have standardized values set forth in IEEE Std 802.3$^{TH}$-2012, for example. Because $\Delta P$ (the margin from the minimum reception sensitivity at the receiver on the OLT side), A' (the splitter loss of the 8-way optical splitter), and B (connector connection loss, splitter excess loss, and the like) are all constants, Expression (9) itself proves to be a constant. In other words, if the distances (L2 to L4) to each of the farthest ONUs connected under the ports B to D can be ascertained, the split ratio (X', Y', Z') of each fiber-optic splitter 302 included in the uneven-split optical splitter 301 is determined.

On the other hand, the following expression holds for the optical power when the light output from the farthest ONU under the port A arrives at the OLT.

[Math. 10]

$$P'_{onu} - A' + 10\{\log_{10}(100-X')-2\} - \beta L_1 - B = P'_{rec} + \Delta P \quad (10)$$

Substituting Expression (6) into Expression (10) and solving for L1 gives

[Math. 11]

$$L_1 = \frac{1}{\beta}\left[ 10\log_{10}\left\{ 1 - 10^{-\frac{C}{10}}\left( 10^{\frac{\beta L_2}{10}} + 10^{\frac{\beta L_3}{10}} + 10^{\frac{\beta L_4}{10}} \right) \right\} + C \right] \quad (11)$$

The transmission loss $\beta$ [dB/km] of the fiber on the right side of Expression (11) has a different value depending on the wavelength used. For example, the transmission loss is a constant 0.5 dB/km in the 1.3 μm band and a constant 0.25 dB/km in the 1.5 μm band. Also, the transmission ranges L2 to L4 are measurable by measuring the round-trip time (RTT) from an internal clock in the OLT by a ranging function of the PON. Consequently, although Expression (10) is a function of the split ratio X', according to Expression (11), it is possible to convert to the distances (L2 to L4) to each of the farthest ONUs connected under the ports B to D to make all terms constants, and thereby compute the distance. In other words, if the distances (L2 to L4) to each of the farthest ONUs connected under the ports B to D can be ascertained, the maximum distance L1 of the port A (that is, the transmission range of the port A) is determined.

In the above description, the service on λ2 is described in terms of the split ratio (X', Y', Z') of each fiber-optic splitter included in the uneven-split optical splitter and the maximum distance L1. Likewise, the service on λ1 can also be computed similarly in terms of the split ratio (X, Y, Z) of each fiber-optic splitter included in the uneven-split optical splitter and the maximum distance L1.

Next, the melt-draw distance Lz satisfying the split ratios for λ1 and λ2 calculated for each fiber-optic splitter are found. At this point, a waveform indicating the relationship between the melt-draw distance Lz and the split ratio like in FIG. 2 is used. Specifically, in the case of the fiber-optic splitter 302-1, the melt-draw distance Lz resulting in the split ratio X for λ1 and the split ratio X' for λ2 computed as described above is found, and the melt-draw distance of the fiber-optic splitter 302-1 is set to Lz.

Finally, the maximum distance L1 for X1 and the maximum distance L1 for λ2 are compared, and the shorter maximum distance L1 is treated as the transmission range of the port A when multiplexing services in the optical communication system.

Figure 11:
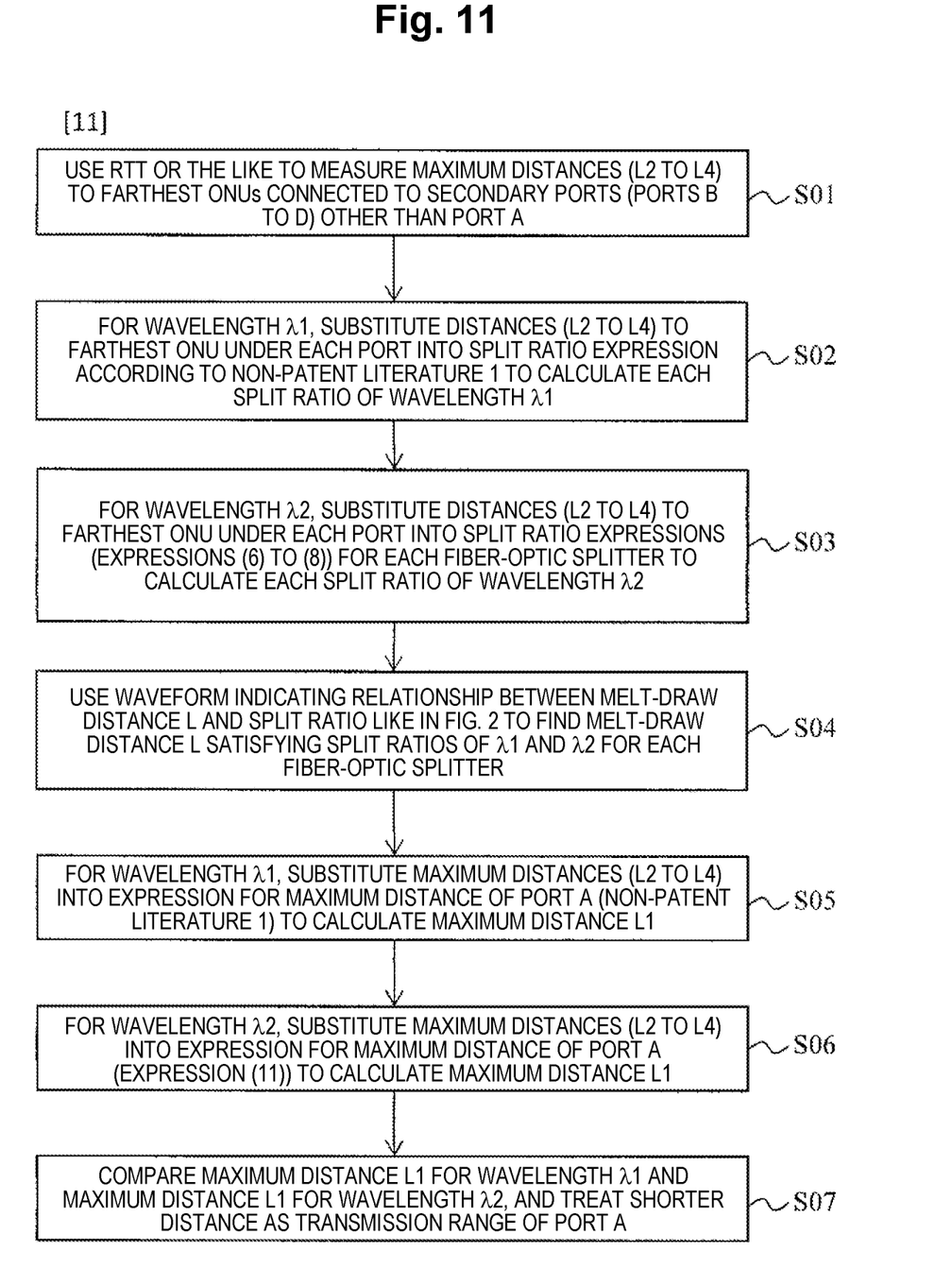
FIG. 11 is a diagram for explaining a split ratio determination method and a transmission range determination method according to the present invention.

FIG. 11 is a flowchart for explaining the split ratio determination method and the transmission range determination method according to the present invention. In these methods, L2 to L4 are measured by measuring the RTT from an internal clock in the OLT (step S01). Additionally, the distances (L2 to L4) to the farthest ONUs are substituted into the split ratio expression according to Non-Patent Literature 1 for one wavelength and into the split ratio expressions (Expressions (6) to (8)) for each fiber-optic splitter for other wavelengths to calculate each split ratio (steps S02 and S03). Additionally, a waveform indicating the relationship between the melt-draw distance Lz and the split ratio like in FIG. 2 is used to find the melt-draw distance Lz satisfying the split ratios for λ1 and λ2 for each fiber-optic splitter (step S04).

On the other hand, for each wavelength, the maximum distances (L2 to L4) are substituted into Expression (11) for the maximum distance of the port A to calculate the maximum distance L1 (steps S05 and S06). Additionally, the maximum distance L1 for the wavelength λ1 and the maximum distance L1 for the wavelength λ2 are compared, and the shorter distance is treated as the transmission range of the port A (step S07).

In this way, in a passive double star PON system, the present invention makes it possible to establish communication with multiple services by all ONUs under the OLTs, while also extending the transmission range reaching the farthest user connected to the port A or increasing the number of connectible users. Here, the split configuration of the initial-stage optical splitter or the split ratios X, Y, Z and X', Y', Z' are adjusted such that the light output from each of the farthest ONU connected under the port B, the farthest ONU connected under the port C, and the farthest ONU connected under the port D arrives with the minimum reception sensitivity at the receiver in each OLT.

Note that although the foregoing describes an example provided with fiber-optic splitters for explanatory convenience, similar effects are also obtained with waveguide optical splitters or free-space optical splitters using optical elements such as a half-mirror and a beam splitter, regardless of material or configuration.

Embodiment 2

Figure 5:
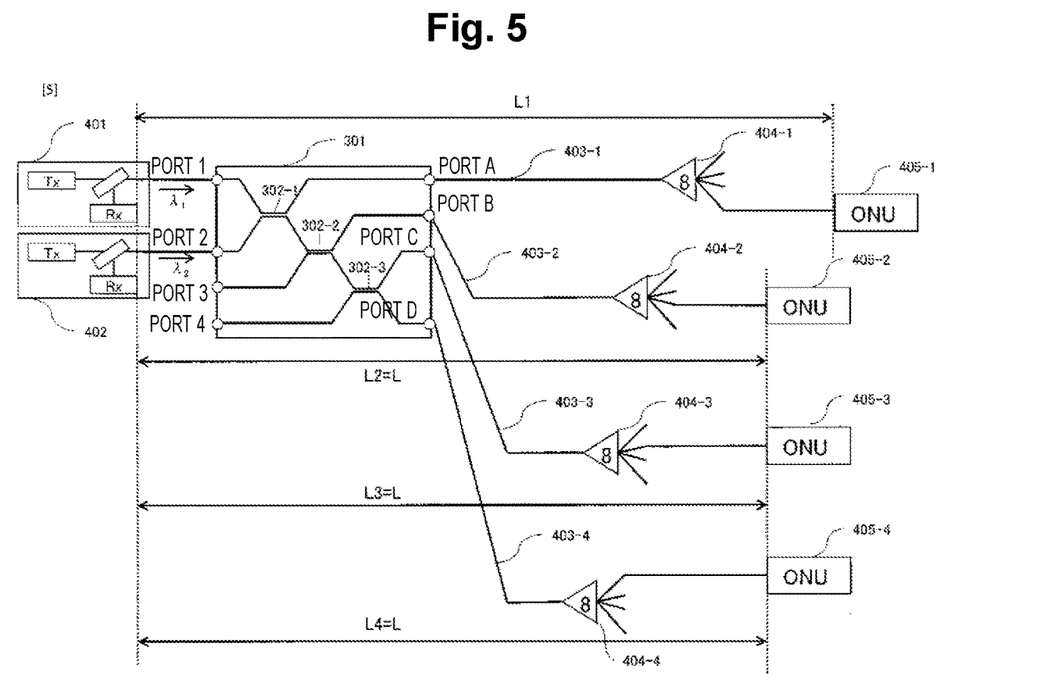
FIG. 5 is a diagram for explaining the optical communication system according to the present invention.

FIG. 5 is a diagram for explaining an optical communication system according to the present embodiment. The present embodiment differs from Embodiment 1 in that in the present embodiment, the distances L2, L3, and L4 to the farthest ONUs under the port B, the port C, and the port D are all the same distance L2=L3=L4. Such a phenomenon may occur in the case where the LD installed on the ONU side has a wide spectral linewidth, such as a Fabry-Perot LD (FP-LD) for example. An FP-LD has a wide spectral width and oscillates on multiple wavelengths, and therefore when the light is transmitted over long distances, differences in the speed of transmission due to wavelength cause degradation in the reception sensitivity from the influence of wavelength dispersion. Consequently, to establish communication, it is necessary to keep the distance to the ONUs at or below a maximum transmission range L [km] that is unaffected by wavelength dispersion.

As indicated in Expression (12), the distance to the farthest ONU under the port B, the farthest ONU under the port C, and the farthest ONU under the port D is designated L [km].

[Math. 12]

$$L_2 = L_3 = L_4 = L \tag{12}$$

If Expression (12) is substituted into Expressions (7) and (8), the split ratios Y' and Z' are determined uniquely as follows.

[Math. 13]

$$Y' = 10^2 \times \left( \frac{10^{\frac{\beta L}{10}}}{10^{\frac{\beta L}{10}} + 10^{\frac{\beta L}{10}} + 10^{\frac{\beta L}{10}}} \right) = 33\% \tag{13}$$

[Math. 14]

$$Z' = 10^2 \times \left( \frac{10^{\frac{\beta L}{10}}}{10^{\frac{\beta L}{10}} + 10^{\frac{\beta L}{10}}} \right) = 50\% \tag{14}$$

Furthermore, Expression (6) can be rewritten as

[Math. 15]

$$X' = 10^2 \times 10^{-\frac{C}{10}} \left( 10^{\frac{\beta L}{10}} + 10^{\frac{\beta L}{10}} + 10^{\frac{\beta L}{10}} \right) \tag{15}$$

$$= 10^2 \times 3 \times 10^{\frac{\beta L - C}{10}} \tag{16}$$

Meanwhile, according to Expression (11), the distance L1 to the farthest ONU under the port A can be expressed as

[Math. 17]

$$L_1 = \frac{1}{\beta} \left[ 10 \log_{10} \left( 1 - 3 \times 10^{\frac{\beta L - C}{10}} \right) + C \right] \tag{17}$$

In this way, in a passive double star PON system, the present invention makes it possible to obtain effects similar to Embodiment 1, even under the limited condition in which the distance to each of the farthest ONUs connected under the port B, the port C, and the port D is the maximum L [km] or less. In other words, by calculating the split ratios X, Y, Z and X', Y', Z' from the maximum distance L and adjusting the melt-draw distance Lz, it is possible to establish communication with multiple services by all ONUs under the OLTs, while also extending the transmission range reaching the farthest user connected to the port A or increasing the number of connectible users.

Embodiment 3

Figure 6:
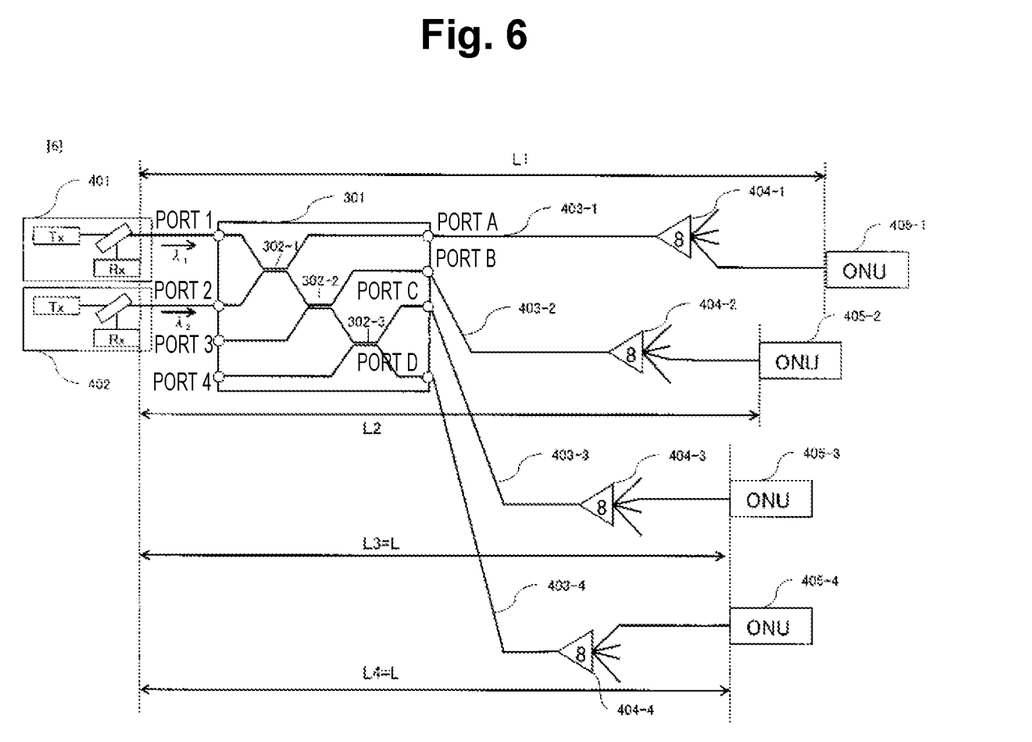
FIG. 6 is a diagram for explaining the optical communication system according to the present invention.

FIG. 6 is a diagram for explaining an optical communication system according to the present embodiment. The present embodiment differs from Embodiment 1 in that, in the present embodiment, the distance L2 to the farthest ONU under the port B is any distance, while the distances L3 and L4 to the farthest ONUs under the port C and the port D are the same distance L3=L4. Such a state may occur in the case of using an FP-LD as the LD in the ONUs on ports C and D for example, similarly to Embodiment 2.

As indicated in Expression (18), the distance to the farthest ONU under the port C and the farthest ONU under the port D is designated L [km].

[Math. 18]

$$L_3 = L_4 = L \tag{18}$$

If Expression (18) is substituted into Expression (8), the split ratio Z' is determined uniquely as follows.

[Math. 19]

$$Z' = 10^2 \times \left( \frac{10^{\frac{\beta L}{10}}}{10^{\frac{\beta L}{10}} + 10^{\frac{\beta L}{10}}} \right) = 50\% \tag{19}$$

Similarly, Expressions (6) and (7) become

[Math. 20]

$$X' = 10^2 \times 10^{-\frac{C}{10}} \left( 10^{\frac{\beta L_2}{10}} + 2 \cdot 10^{\frac{\beta L}{10}} \right) \tag{20}$$

[Math. 21]

$$Y' = 10^2 \times \left( \frac{10^{\frac{\beta L_2}{10}}}{10^{\frac{\beta L_2}{10}} + 2 \cdot 10^{\frac{\beta L}{10}}} \right) \tag{21}$$

Furthermore, according to Expression (11), the distance L1 to the farthest ONU under the port A can be expressed as

[Math. 22]

$$L_1 = \frac{1}{\beta} \left[ C + 10 \log_{10} \left\{ 1 - \left( 10^{\frac{\beta L_2 - C}{10}} + 2 \cdot 10^{\frac{\beta L - C}{10}} \right) \right\} \right] \tag{22}$$

In this way, in a passive double star PON system, the present invention makes it possible to obtain effects similar to Embodiment 1, even under the condition in which the distance to each of the farthest ONU connected under the port C and the farthest ONU connected under the port D is the maximum L [km] or less. In other words, by calculating the split ratios X, Y, Z and X', Y', Z' from the maximum distances L and L2 and adjusting the melt-draw distance Lz, it is possible to establish communication with multiple services by all ONUs under the OLTs, while also extending the transmission range reaching the farthest user connected to the port A or increasing the number of connectible users.

Embodiment 4

Figure 7:
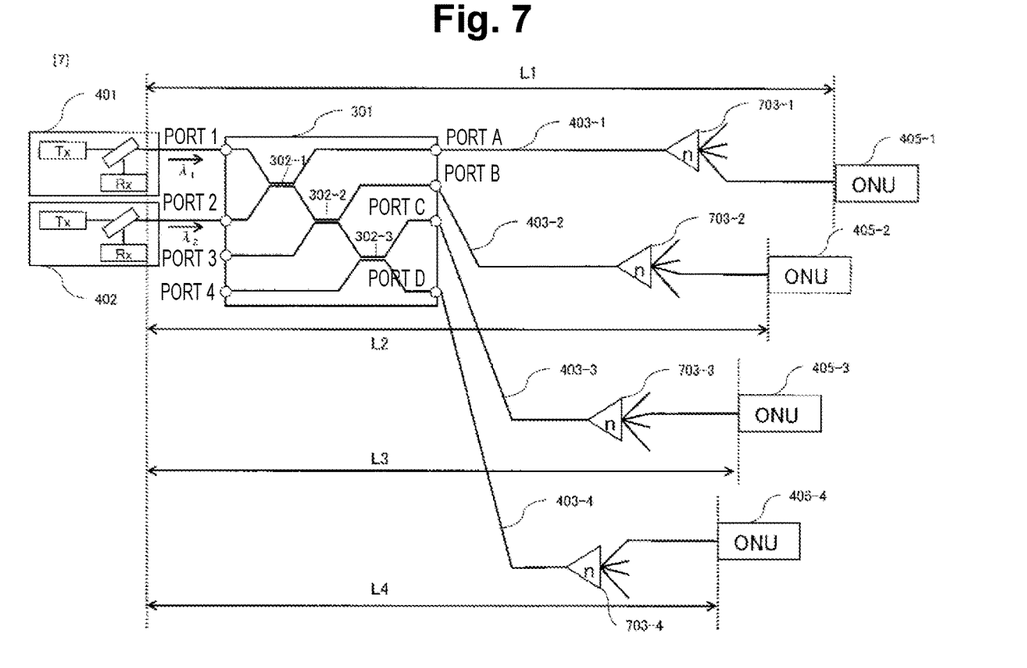
FIG. 7 is a diagram for explaining the optical communication system according to the present invention.

FIG. 7 is a diagram for explaining an optical communication system according to the present embodiment. The present embodiment differs from Embodiment 1 in that, in the present embodiment, the number of splits in the second-stage optical splitter is generalized to n (where n is an integer equal to or greater than 2). At this time, the split ratios at the split points in the second-stage optical splitter are all assumed to be 50%. The signs 703-1 to 703-4 indicate the second-stage n-way optical splitters. The splitter loss of the n-way optical splitters can be expressed as a combination of 2-way optical splitters, and because the number of split points is $2^n$, the splitter loss is $3 \log_2 n$ [dB]. At this time, the split ratios X', Y', and Z' of the uneven-split splitter are given by Expressions (6), (7), (8), and "C" in Expression (9) can be expressed as "C'" in Expression (23). Note that the split ratios X, Y, and Z of the uneven-split splitter are acquired according to the expressions described in Non-Patent Literature 1.

[Math. 23]

$$C' = P_{onu}' - (P_{rec}' + \Delta P) - 3 \log_2 n - B \qquad (23)$$

Also, the transmission range L1 of the port A is given by Expression (11).

In this way, in a passive double star PON system, the present invention makes it possible to establish communication with multiple services by all ONUs under the OLTs, while also extending the transmission range reaching the farthest user connected to the port A or increasing the number of connectible users. Here, the split configuration of the initial-stage optical splitter or the split ratios X, Y, Z and X', Y', Z' are adjusted such that the light output from each of the farthest ONU connected under the port B, the farthest ONU connected under the port C, and the farthest ONU connected under the port D arrives with the minimum reception sensitivity at the receiver in each OLT.

Embodiment 5

Figure 8:
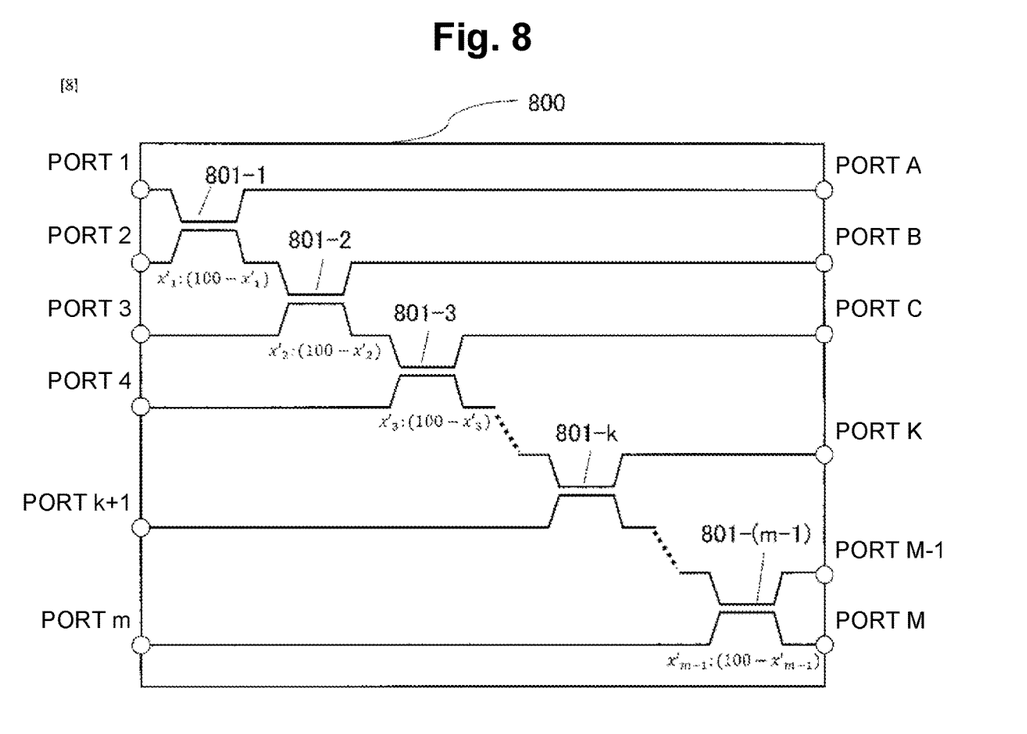
FIG. 8 is a diagram for explaining an uneven-split optical splitter provided in the optical communication system according to the present invention.

The present embodiment will be described using FIGS. 8 and 9. In FIG. 8, the sign 800 indicates an uneven-split optical splitter in which the number of splits is m (where m is an integer equal to or greater than 2), and the signs 801-1 to 801-($m$−1) indicate the split points. Here, the uneven-split optical splitter 800 is configured as follows.

In the 1st-stage fiber-optic splitter 801-1, the 1st port (port 1) and the 2nd port (port 2) among the primary ports are connected as two inputs, and one of the two obtained outputs is connected to the 1st port (port A) among the secondary ports. In the kth-stage (where k is an integer equal to or greater than 2 and equal to or less than m−2) fiber-optic splitter 801-$k$, one of the two inputs is connected to the (k+1)th port (port k+1) among the primary ports, and the other input is connected to one of the two outputs of the (k−1)th-stage fiber-optic splitter 801-($k$−1). In the kth-stage fiber-optic splitter 801-$k$, one of the two obtained outputs is connected to the kth port (port K) among the secondary ports.

In the (m−1)th-stage fiber-optic splitter 801-($m$−1), one of the two inputs is connected to the mth port (port m) among the primary ports, and the other input is connected to one of the two outputs of the (m−2)th-stage fiber-optic splitter 801-($m$−2). Additionally, the two obtained outputs are connected respectively to the (m−1)th port (port M−1) and the mth port (port M) among the secondary ports.

However, the (m−1)th-stage fiber-optic splitter 801-($m$−1) exists in the case where m is 3 or greater, and the kth-stage fiber-optic splitter 801-$k$ exists in the case where m is 4 or greater.

The split ratios for λ1 at each of the split points 801-1 to 801-($m$−1) are
(801-1) $x_1$: 100−$x_1$,
(801-$k$) $x_k$: 100−$x_k$, and
(801-($m$−1)) $x_{m-1}$: 100−$x_{m-1}$,
where $x_1$ to $x_{m-1} > 0$.

Also, the split ratios for λ2 at each of the split points 801-1 to 801-($m$−1) are
(801-1) $x_1'$: 100−$x_1'$,
(801-$k$) $x_k'$: 100−$x_k'$, and
(801-($m$−1)) $x_{m-1}'$: 100−$x_{m-1}'$,
where $x_1'$ to $x_{m-1}' > 0$.

Note that the ports 1 to m are the primary ports on the OLT side while the ports A to M are the secondary ports on the ONU side, and there is an equal number of primary ports and secondary ports (m=M).

Figure 9:
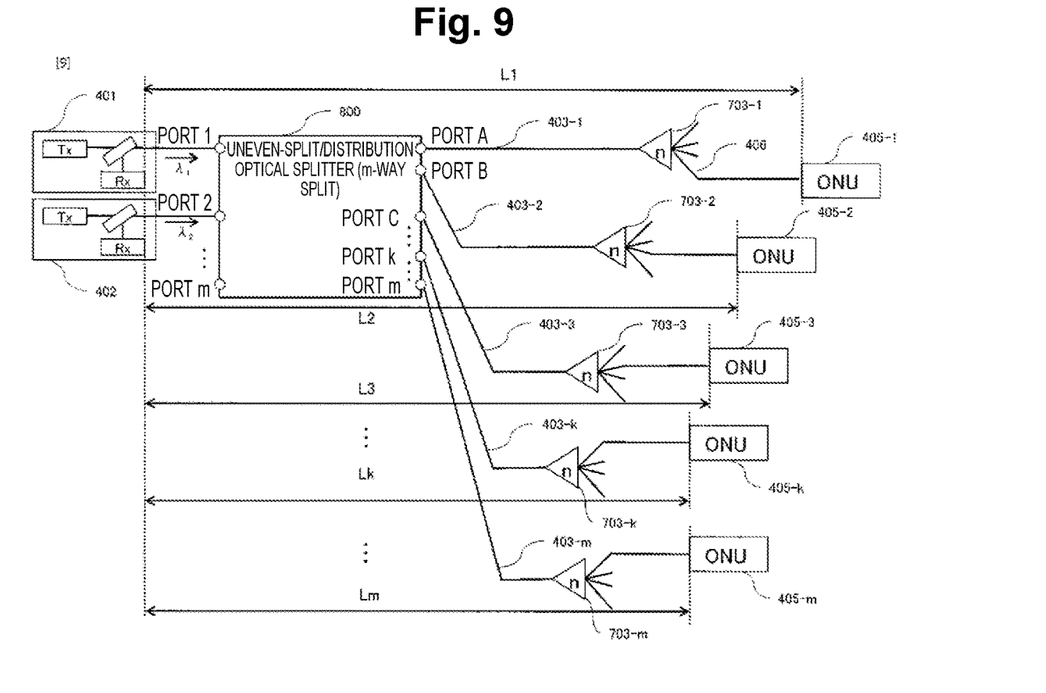
FIG. 9 is a diagram for explaining the optical communication system according to the present invention.

FIG. 9 is a diagram for explaining an optical communication system according to the present embodiment. As described hereinafter, the optical communication system according to Embodiment 4 is provided with an uneven-split optical splitter 800, optical line terminals (401 and 402), and optical network units (405-1 to 405-$m$). Here, the uneven-split optical splitter 800 is an optical splitter in which m−1 2×2 fiber-optic splitters are combined and connected between m primary ports and m secondary ports (where m is an integer equal to or greater than 2). The optical line terminals (401 and 402) input and output optical signals of different wavelengths with respect to the 1st and 2nd primary ports (ports 1 and 2) of the uneven-split optical splitter 800, or input and output a wavelength-multiplexed optical signal with respect to one of the 1st and 2nd primary ports (port 1 or 2). The optical network units (405-1 to 405-$m$) input and output an optical signal of a single wavelength or a wavelength-multiplexed optical signal with respect to each of the secondary ports (ports A to M) of the uneven-split optical splitter 800.

In the optical communication system according to Embodiment 4, at least one or more even-split optical splitters 703 are disposed between the secondary ports (ports A to M) of the uneven-split optical splitter 800 and optical network units (405-1 to 405-$m$).

In the optical communication system, the uneven-split optical splitter 800 is installed in the initial stage, and the n-way even-split/distribution optical splitters 703 are installed in the 2nd stage. The present embodiment differs from Embodiment 1 in that, in the present embodiment, the uneven-split optical splitter in the initial stage is generalized to the uneven-split optical splitter 800.

Here, for any integer K such that 1≤K≤m (=M), provided that Lk [km] is the distance to the farthest ONU under the secondary port K, when light input from the port 2 arrives with the minimum reception sensitivity in the OLT (sign 402), the following expressions hold for the ports B to M.

When K=2:

[Math. 24]

$$P'_{onu} - 3 \log_2 n + 10\{\log_{10}(x'_1 \cdot x'_2) - 4\} - \beta L_2 - B = P'_{rec} + \Delta P \qquad (24)$$

When 3≤K≤M−1:

[Math. 25]

$$P'_{onu} - 3 \log_2 n + 10\left\{\log_{10}\left[\prod_{l=2}^{K-1} \{x'_1 \cdot (100 - x'_l) \cdot x'_K\}\right] - 2K\right\} - \alpha L_K - B = P'_{rec} + \Delta P \qquad (25)$$

When K=M:

[Math. 26]

$$P'_{onu} - 3\log_2 n + 10\left\{\log_{10}\left[\prod_{l=2}^{K-1}\{x'_1 \cdot (100 - x'_l)\}\right] - 2K\right\} - \alpha L_K - B = \qquad (26)$$
$$P'_{rec} + \Delta P$$

Expressions (24) to (26) are a system of simultaneous equations of (m−1)th order for the (m−1) split ratios $x'_1$ to $x'_{m-1}$, and solving the equations allows the split ratios $x'_1$ to $x'_{m-1}$ to be expressed in terms of known constants such as the maximum distances L2 to Lm and the loss, similarly to Expressions (6) to (8). In other words, if the distances (L2 to Lm) to each of the farthest ONUs connected under the ports B to M can be ascertained, the split ratio ($x'_1$ to $x'_{m-1}$) of each fiber-optic splitter 801 included in the uneven-split optical splitter 800 is determined.

Also, an equation is created similarly for the port A (that is, for the case where K=1).
When K=1:

[Math. 27]

$$P'_{onu} - 3\log_2 n + 10\{\log_{10}(100 - x'_1) - 2\} - \beta L_1 - B = P'_{rec} + \Delta P \qquad (27)$$

Solving Expression (27) for L1 gives

[Math. 28]

$$L_1 = \frac{1}{\beta}\{C + 10(\log_{10}(100 - x'_1) - 2)\} \qquad (28)$$

In other words, if the distances (L2 to Lm) to each of the farthest ONUs connected under the ports B to M can be ascertained, the maximum distance L1 of the port A (that is, the transmission range of the port A) is determined.

Similarly to the description of Embodiment 1, the split ratios ($x_1$ to $x_{m-1}$) of the fiber-optic splitters included in the uneven-split optical splitter and the maximum distance L1 are calculated for the service on λ1, the split ratios ($x_1'$ to $x_{m-1}'$) and the maximum distance L1 are also calculated for the service on λ2, and the shorter maximum distance L1 is treated as the transmission range of the port A when multiplexing services in the optical communication system.

In this way, in a passive double star PON system, the present invention makes it possible to establish communication with multiple services by all ONUs under the OLTs, while also extending the transmission range reaching the farthest user connected to the port A or increasing the number of connectible users. Here, the above effects are achieved by adjusting the split configuration of the initial-stage optical splitter or the split ratios $x_1$ to $x_{m-1}$ and $x_1'$ to $x_{m-1}'$ such that the light output from the farthest ONU among the ports respectively connected under the ports B to M of the uneven-split optical splitter in the initial stage arrives with the minimum reception sensitivity at the OLT receiver.

Although m=M is assumed here for convenience, it is sufficient for the primary port side to have a number of open ports equal to the number of input services, and therefore m can be generalized as any integer equal to or greater than the number of input services and also M or less.

The uneven-split optical splitter to which the above generalization is applicable is limited to a structure like that of FIG. 8, in which one of the two fibers extending from a split point is connected to a secondary port while the other fiber is fused to a fiber connected to the next split point, this structure being repeated any number of times.

Embodiment 6

Embodiments 1 to 5 describe a passive double star configuration in which the terminal (OLT) installed on the exchange side and the subscriber device (ONU) installed on the subscriber's home side are connected via two optical splitters, but the present invention is not limited to this configuration.

Figure 10:
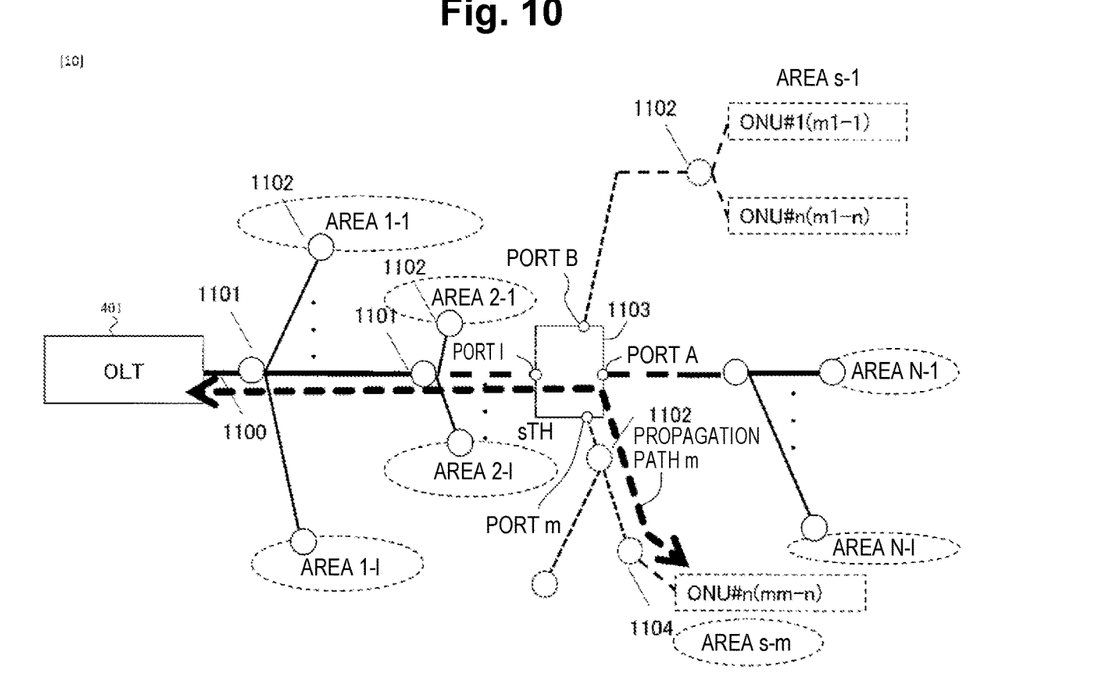
FIG. 10 is a diagram for explaining the optical communication system according to the present invention.

FIG. 10 is a diagram for explaining an optical communication system according to Embodiment 6. The optical communication system is a passive optical network in which an OLT and ONUs are connected via a plurality of optical splitters. In the diagram, the sign 1100 indicates a trunk line optical fiber connected to an exchange, the sign 1101 indicates an even-split optical splitter (1:1), the sign 1102 indicates an even-split optical splitter (1:n), the sign 1103 indicates the sth (where s is an integer equal to or greater than 1) uneven-split optical splitter (1:m) from an OLT connected to the trunk line optical fiber, and the sign 1104 indicates the oth (where o is an integer equal to or greater than 1) even-split optical splitter (1:n) connected under the mth secondary port of the uneven-split optical splitter 1103. In the optical communication system, at least one or more even-split optical splitters 1101 are disposed between the primary ports of the uneven-split optical splitter 1103 and the optical line terminal 401.

It is sufficient to compute the split ratio of the uneven-split optical splitter 1103 as described in Embodiment 5. That is, it is sufficient to determine the split ratio such that the output optical power from the farthest ONUs connected under the secondary ports (ports B to M) other than the 1st secondary port (port A) of the uneven-split optical splitter 1103 is the minimum reception sensitivity when arriving at the OLT. In other words, like the propagation path m in FIG. 10, if the number of uneven-split optical splitters is "1" and the number of even-split optical splitters is (s+o−1) among the total number (s+o) of optical splitters, the configuration of the network topology is not limited, and the transmission range of the trunk line optical fiber that connects to the 1st secondary port (port A) of the uneven-split optical splitter 1103 can be determined. Here, the split ratio is determined for each input service according to the methods described in Embodiments 1 to 5.

[Supplement]

An object of the present invention is to achieve an optical signal transmission system and an optical signal transmission method that set a different split ratio for each service independently, and thereby provide a plurality of services to users while also extending the transmission range for an unbalanced user distribution and accommodating users efficiently, which are the goals of an uneven-split optical splitter.

To achieve the above object, in the present invention, the melt-draw distance is used to adjust the split ratio of each fiber-optic splitter included in the uneven-split optical splitter such that the light output from the farthest ONUs among each of the ports connected under the ports B to M of the uneven-split optical splitter arrives with the minimum reception sensitivity at the OLT receivers in the PON system.

According to the present invention, it is possible to establish communication with multiple services by all ONUs under the OLTs, while also extending the transmission range reaching the farthest user connected to the port A of the uneven-split optical splitter or increasing the number of connectible users.

REFERENCE SIGNS LIST 100, 101 input port
102, 103 output port
104 split location
301 uneven-split optical splitter
302-1 to 302-3 split point (melt-draw location)
303-1 to 303-6 output fiber from split point
401, 402 OLT
403-1 to 403-4 main subscriber fiber-optic line
404-1 to 404-4 second-stage 8-way optical splitter
406 eight branch subscriber fiber-optic lines
405-1 to 405-4 farthest ONU
800 uneven-split optical splitter
801-1 to 801-($m$−1) split point
703-1 to 703-$m$ second-stage n-way optical splitter
1100 trunk line optical fiber
1101 even-split optical splitter (1:1)
1102 even-split splitter (1:n)
1103 uneven-split splitter (1:m)
1104 even-split optical splitter (1:n)

The invention claimed is:

1. An optical communication system comprising:
an uneven-split optical splitter in which m−1 2×2 fiber-optic splitters are combined and connected between m primary ports and m secondary ports (where m is an integer equal to or greater than 2);
an optical line terminal that inputs and outputs optical signals of different wavelengths with respect to 1st and 2nd primary ports of the uneven-split optical splitter, or inputs and outputs a wavelength-multiplexed optical signal with respect to one of the 1st and 2nd primary ports; and
an optical network unit that inputs and outputs optical signals of a single wavelength or wavelength-multiplexed optical signals with respect to each of the secondary ports of the uneven-split optical splitter,
wherein in the uneven-split optical splitter,
the two inputs of the fiber-optic splitter in a 1st stage are connected to the 1st and 2nd primary ports, and one of the two outputs is connected to the 1st secondary port,
one of the two inputs of the fiber-optic splitter in a kth stage (where k is an integer equal to or greater than 2 and equal to or less than m−2) is connected to the (k+1)th primary port while the other of the two inputs is connected to one of the two outputs of the fiber-optic splitter in a (k−1)th stage, and one of the two outputs is connected to the kth secondary port,
one of the two inputs of the fiber-optic splitter in a (m−1)th stage is connected to the mth primary port while the other of the two inputs is connected to one of the two outputs of the fiber-optic splitter in a (m−2)th stage, and the two outputs are connected to the (m−1)th and mth secondary ports, and
each of the fiber-optic splitters
has a melt-draw distance that achieves a split ratio determined by a maximum distance and a wavelength, such that an optical signal from the optical network unit at the maximum distance from the optical line terminal existing at each secondary port other than the 1st secondary port arrives at the optical line terminal with a minimum reception sensitivity or higher for all wavelengths,
where the fiber-optic splitter in the (m−1)th stage exists in a case where m is 3 or greater, and the fiber-optic splitter in the kth stage exists in a case where m is 4 or greater.

2. The optical communication system according to claim 1, wherein
at least one or more even-split optical splitters are disposed between the secondary ports of the uneven-split optical splitter and the optical network unit.

3. The optical communication system according to claim 1, wherein
at least one or more even-split optical splitters are disposed between the primary ports of the uneven-split optical splitter and the optical line terminal.

4. A split ratio determination method of determining a split ratio of an uneven-split optical splitter for an optical communication system, the optical communication system including
an uneven-split optical splitter in which m−1 2×2 fiber-optic splitters are combined and connected between m primary ports and m secondary ports (where m is an integer equal to or greater than 2),
an optical line terminal that inputs and outputs optical signals of different wavelengths with respect to the 1st and 2nd primary ports of the uneven-split optical splitter, or inputs and outputs a wavelength-multiplexed optical signal with respect to one of the 1st and 2nd primary ports, and
an optical network unit that inputs and outputs optical signals of a single wavelength or wavelength-multiplexed optical signals with respect to each of the secondary ports of the uneven-split optical splitter,
wherein in the uneven-split optical splitter,
the two inputs of the fiber-optic splitter in a 1st stage are connected to the 1st and 2nd primary ports, and one of the two outputs is connected to the 1st secondary port,
one of the two inputs of the fiber-optic splitter in a kth stage (where k is an integer equal to or greater than 2 and equal to or less than m−2) is connected to the (k+1)th primary port while the other of the two inputs is connected to one of the two outputs of the fiber-optic splitter in a (k−1)th stage, and one of the two outputs is connected to the kth secondary port,
one of the two inputs of the fiber-optic splitter in a (m−1)th stage is connected to the mth primary port while the other of the two inputs is connected to one of the two outputs of the fiber-optic splitter in a (m−2)th stage, and the two outputs are connected to the (m−1)th and mth secondary ports,
the split ratio determination method comprising:
detecting, for each secondary port other than the 1st secondary port, a maximum distance between the optical network unit farthest from the optical line terminal and the optical line terminal;
computing a split ratio by wavelength for each fiber-optic splitter by substituting the maximum distance into a function of the split ratio of the fiber-optic splitter, the maximum distance, and the wavelength; and
finding a melt-draw distance for each fiber-optic splitter by which the computed split ratios for each wavelength are achieved at the same time,
where the fiber-optic splitter in the (m−1)th stage exists in a case where m is 3 or greater, and the fiber-optic splitter in the kth stage exists in a case where m is 4 or greater.

5. A transmission range determination method comprising:

using the split ratio of the fiber-optic splitter in the 1st stage computed by the split ratio determination method according to claim 4 to compute, for each wavelength, a maximum distance between the optical line terminal and the optical network unit farthest from the optical line terminal and connected to the 1st secondary port, and treating the shortest maximum distance as the transmission range of the 1st secondary port.

\* \* \* \* \*